April 7, 1970 K. PENNYCUICK 3,504,561
BELT DRIVE
Filed July 19, 1968 8 Sheets-Sheet 1

INVENTOR
KENNETH PENNYCUICK

FIG. 3

April 7, 1970     K. PENNYCUICK     3,504,561

BELT DRIVE

Filed July 19, 1968     8 Sheets-Sheet 3

INVENTOR
KENNETH PENNYCUICK
BY Brown Jackson
Boettele, Dienner ATTORNEYS

April 7, 1970  K. PENNYCUICK  3,504,561

BELT DRIVE

Filed July 19, 1968  8 Sheets-Sheet 5

INVENTOR
KENNETH PENNYCUICK
BY
ATTORNEYS

April 7, 1970   K. PENNYCUICK   3,504,561
BELT DRIVE

Filed July 19, 1968   8 Sheets-Sheet 6

INVENTOR
KENNETH PENNYCUICK
BY Brown Jackson
Boettcher & Lieuwen ATTORNEYS

FIG. 8

United States Patent Office 3,504,561
Patented Apr. 7, 1970

3,504,561
BELT DRIVE
Kenneth Pennycuick, Sark, Guernsey, Channel Islands, England, assignor to British Ropes Limited, Doncaster, Yorkshire, England, a British company
Filed July 19, 1968, Ser. No. 746,044
Claims priority, application Great Britain, July 19, 1967, 33,118/67
Int. Cl. F16g 1/28; F16h 7/02
U.S. Cl. 74—237                              3 Claims

ABSTRACT OF THE DISCLOSURE

A flexible belt drive comprises a multiplicity of spaced high tensile filamentary elements in the desired width and transmission units located transversely on the spaced elements in spaced relation longitudinally thereof to facilitate a positive transmission of power.

A method of forming the belt comprises the steps of aligning a series of spaced filamentary elements and securing transmission units transversely thereof, at spaced intervals longitudinally of the filamentary elements.

---

The invention I am about to describe relates to an improved driving system for the transmission of power.

It is well known to transmit power from a generating source such as an electric motor to a machine or installation, requiring motivation, via a belt, which may be composed of leather, or woven natural and/or synthetic fibres.

It is further known to transmit power by means of chains manufactured from metal or reinforced elastomeric materials including rubber, both natural and synthetic.

In many cases, the said means of transmission are costly, both to install and maintain. They have in certain instances the disadvantage of being heavy and noisy in use and, almost without exception if maximum efficiency is to be achieved, the machines to which they are to be applied need to possess a means for ensuring correct alignment and tensioning.

In one aspect the invention consists in a flexible driving belt of equi-spaced, parallel, metallic filaments comprising single wires or, alternatively, strands composed of a plurality of helically twisted wires and units placed transversely on the belt in spaced relationship to facilitate a positive transmission of power.

In another aspect the invention consists in a flexible driving belt comprising a multiplicity of equi-spaced and parallel high tensile filamentary elements, laid in the horizontal plane to the desired width, the said filamentary elements being maintained in their desired relationship by the transverse attachment, to the composite belt at regular intervals, of "transmission units" moulded or mechanically fastened into their prescribed positions.

If desired, more than one filamentary "belt" or "ribbon" may be placed in stacked relationship with equal, or unequal, spacing within the stack, the filaments being maintained in their desired relationship, in both the horizontal and vertical planes, by the aforesaid transmission units.

The individual filamentary metallic elements may or may not, as circumstances dictate, be covered by any suitable means with a protective layer of zinc, aluminium, rubber (natural or synthetic), or any similar plastic composition.

The filamentary elements, preferably manufactured from steel, are suitable heat treated and quenched, followed by cold drawing to produce a condition where the tensile and fatigue resistance are at a maximum.

In another aspect the invention consists in a method of forming a flexible driving belt comprising the steps of aligning a series of spaced filamentary elements and securing transmission units transversely thereof, at spaced intervals longitudinally of the filamentary elements.

Conveniently the lower halves of spaced transmission units are first attached followed by attachment of the upper halves.

The attachment of the transmission units may be effected or assisted by a moulding operation including the solidification of a liquid composition.

For the purpose of describing the invention the term "belt" or "ribbon" is defined as a prescribed length of filamentary elements laid parallel to one another in the horizontal plane, the filamentary elements being interconnected at equi-spaced intervals by transversely attached "driving" modules.

The ends of the said "belt" or "ribbon" may be joined together to form an endless loop or, alternatively, the prescribed length may have an anchorage or gripping device attached at either extremity, permitting limited traverse in either direction, as distinct from a "loop" which is capable of continuous motion in a given direction.

The invention overcomes these deficiencies of previous driving systems and, in addition, possesses the following distinctive advantages.

(a) A high strength-to-weight ratio.
(b) Extreme flexibility.
(c) Low cost.
(d) Positive transmission of power due to prevention of slip.
(e) Elimination of high driving tensions and, hence, undue wear on bearings.
(f) Self aligning characteristics.
(g) Versatility with regard to fields of application.
(h) Ease of installation.
(i) Ability to function satisfactorily in adverse conditions, for example, corrosive environments, iwth little or no attention.

The invention will be further described with reference to the accompanying drawings, as follows:

FIGURE 4a shows a detail of FIGURE 4 and

FIGURE 4b a winding handle for use in combination with the component of FIGURE 4a.

FIGURE 5 is an isometric drawing of the manner by which the invention transmits power to the driving wheel of a machine.

Figure 1:
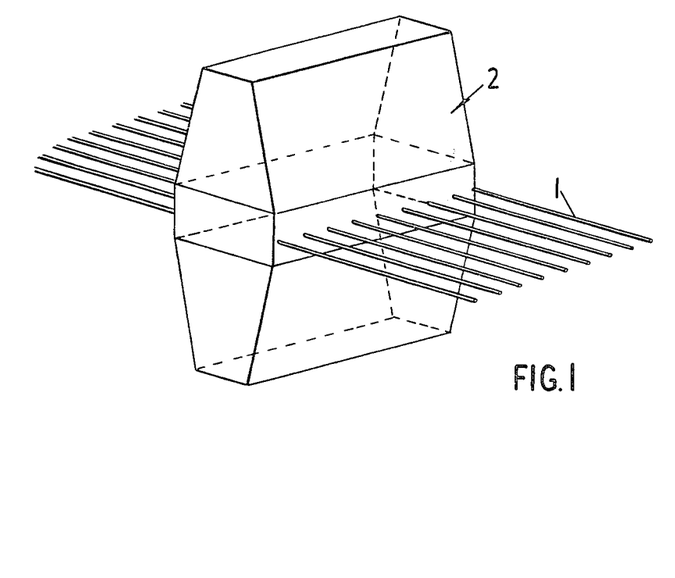
FIGURE 1 is an isometric drawing of a single layer filamentary belt, with "truncated" transmission units attached.

As shown in FIGURE 1, two or more equi-spaced metallic filaments 1 are laid parallel to one another across the horizontal plane and at pre-determined intervals a "driving" or "transmission" module 2 is attached to encompass the belt transversely to its longitudinal axis.

Figure 2:
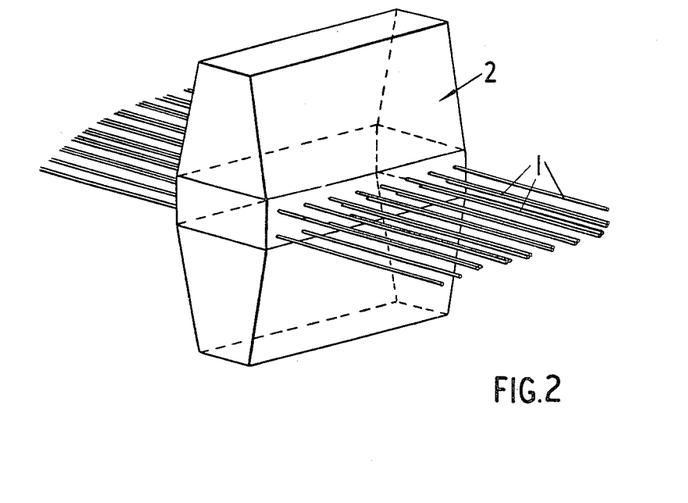
FIGURE 2 is an isometric drawing of a laminated or multiple filamentary belt, with truncated transmission units attached.

Alternatively, as shown in FIGURE 2, two or more layers of filamentary elements 1 may be placed in stacked relationship, whereby, although the filaments in any particular layer are parallel and equi-spaced, they are staggered in relation to the overlying and underlying filaments.

Figure 3:
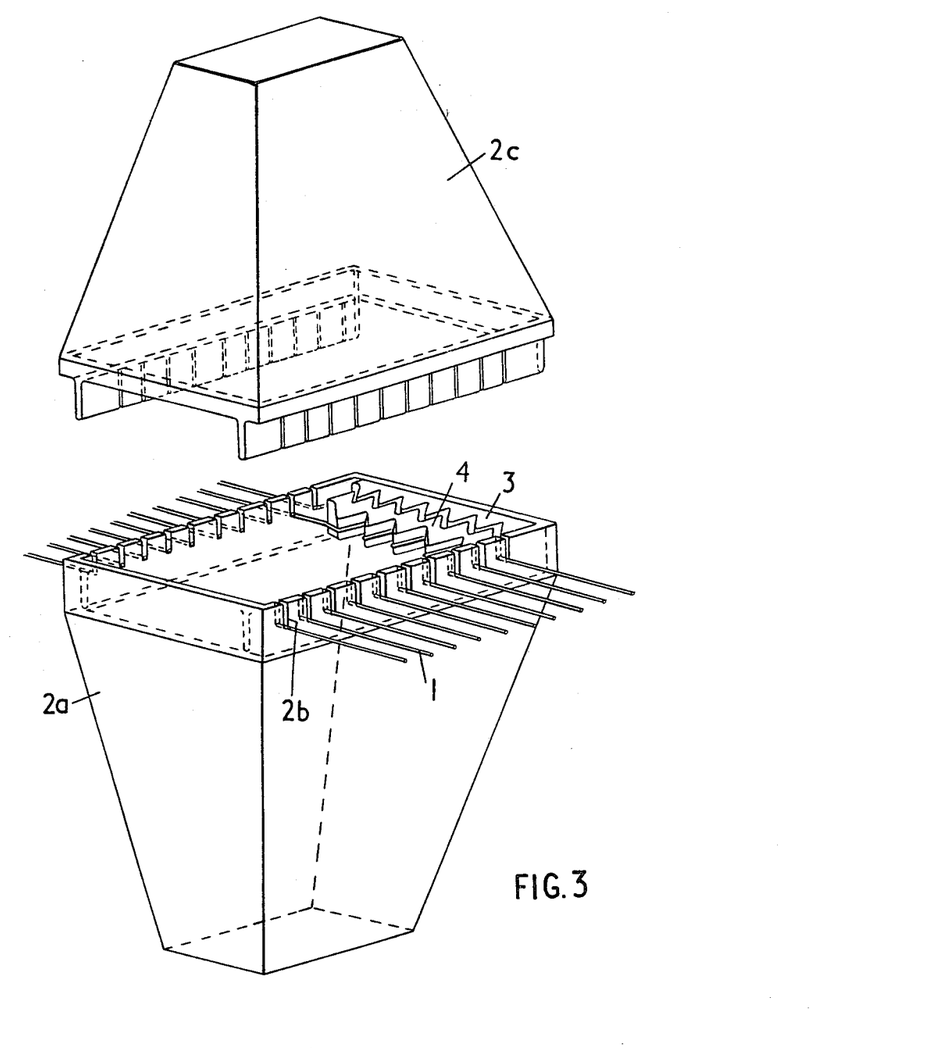
FIGURE 3 is an isometric drawing showing one example by which the transmission units are attached to the belt.

A preferred form of driving unit at intermediate positions along the "belt" or "ribbon" is that shown in FIGURE 3 and consists of a rectangular tray 2a, the lengthwise walls being slotted as at 2b to accept the requisite metallic filaments. The bottom of the tray is thickened externally to form a desired geometric shape, in this instance an inverted and truncated pyramid lying in the vertical plane.

Figures 3A, 3B:
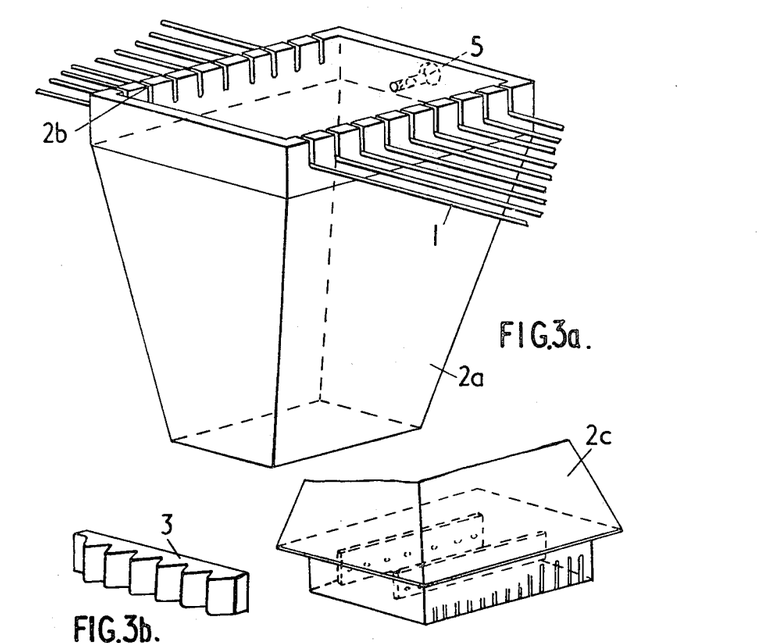
FIGURE 3a, FIGURE 3b and FIGURE 3c show components of the FIGURE 3 assembly.
Figures 3C, 3D, 4:
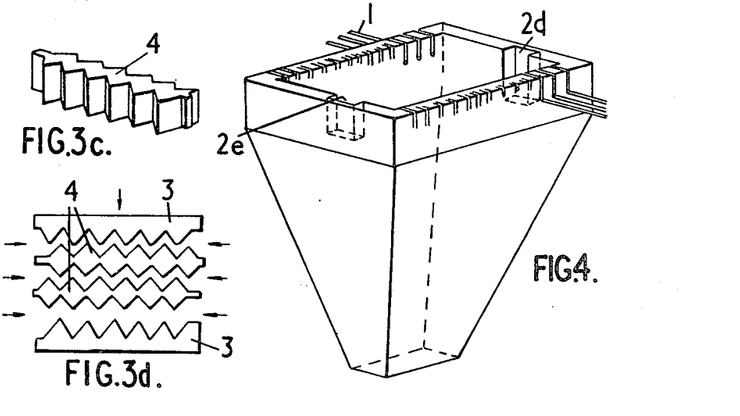
FIGURE 3d is a plan view looking down on the component of FIGURE 3a with components of FIGURES 3b and 3c in phase therein.
FIGURE 4 is an isometric drawing partly broken away illustrating another example of the manner in which a belt may be joined.

In order to ensure that the driving module remains securely in its prescribed position and is firmly attached to the metallic filaments, a series of crimping units 3 (FIGURE 3b) and 4 (FIGURE 3c) capable of functioning in a manner similar to the manner shown in FIGURE 3d is employed.

Unit 3 is inserted into the tray 2a with its plane face in contact with the rotary means of compression 5 which is moulded into the wall of the tray 2a, whilst the serrated face of 3 faces the first metallic filament.

A series of separator strips 4, having their opposing faces serrated are placed between adjacent pairs of wires until the opposing wall of the tray is reached. At this stage a unit 3 is inserted between the last metallic filament and the tray wall, the serrations on this unit 3 being in the opposite way to those on the first unit 3.

Upon rotation of the compressive screw 5 the serrated segments are pressed together and crimp the metallic filaments into firm engagement.

To achieve even greater permanency of anchorage, and provide a means of securing the upper half of the "driving" module, the tray may be filled with either a molten elastomeric material, or a cold setting resin such as polyester resin. The upper half of the said driving module 2c shown in FIGURE 3, is lowered into position in the manner shown, and the whole allowed to set.

If it is desired to join a "belt" or "ribbon" made according to the invention into an endless loop, a terminal module similar to that shown in FIGURE 4 may be employed.

The terminal module has the same external shape as the intermediate driving module, including the tray-like cavity moulded as an integral part of the lower half. However, it is moulded to provide two recesses 2d, 2e in the walls, with dimensions to accommodate the spigots 6a, 6b at the two ends of the anchorage bar 6.

the terminal module is employed in the following manner. The individual filaments from opposing ends of the "belt" or "ribbon" are alternately threaded through adjacent holes in the bar 6, the anchorage bar is then rotated by a spigoted key 7 (FIGURE 4b) until the requisite even tension is achieved, whereupon spigot 6a is lowered into the slot 2d whilst the key 7 is withdrawn from the anchorage bar, after which the spigot 6b may be pressed into the slot 2e.

The tray 2a is then filled with a suitable casting agent i.e. Woods metal or polyester resin, and the upper half of the "driving" module inserted into position and the whole allowed to set.

The upper and lower "driving" modules may be cast or moulded from a metal or alloy, or a rigid elastomeric material such as rubber, nylon, polypropylene or the like. Having described the particular invention, some examples of the manner in which it may be employed are now outlined.

Figures 4A, 4B, 5:
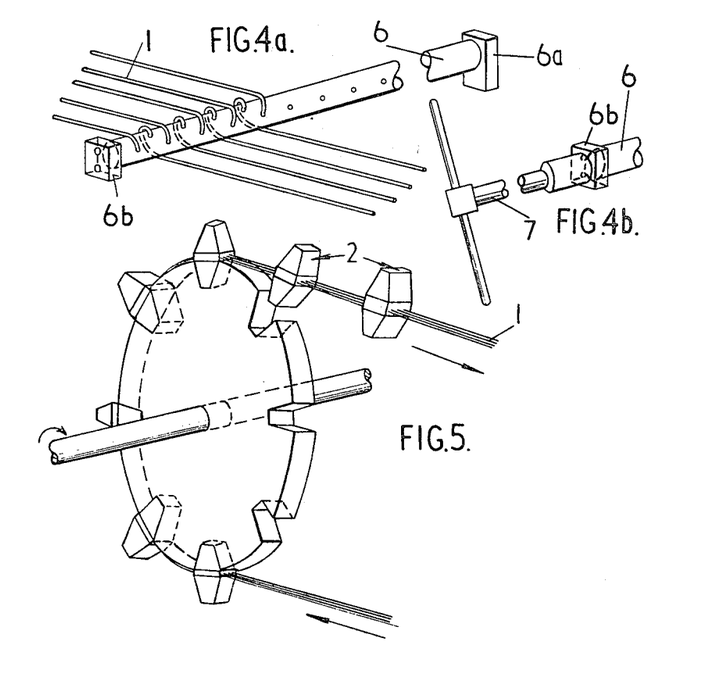
Figure 5A:
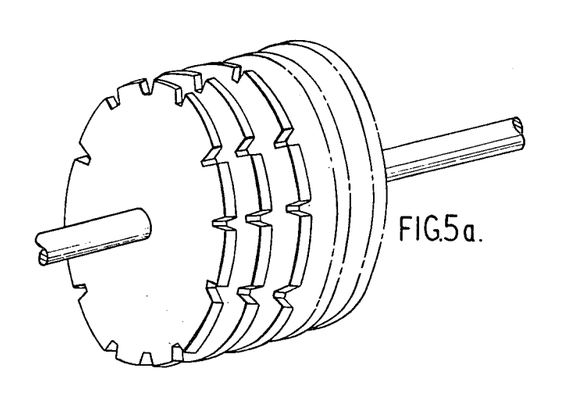
FIGURE 5a shows a plurality of such driving wheels.

In FIGURE 5, an example is given which indicates the manner whereby the employment of double truncated driving modules 2 imparts a positive drive to the shaft of a machine whilst FIGURE 5a shows the employment of multiple belts, made according to the invention.

Figure 6:
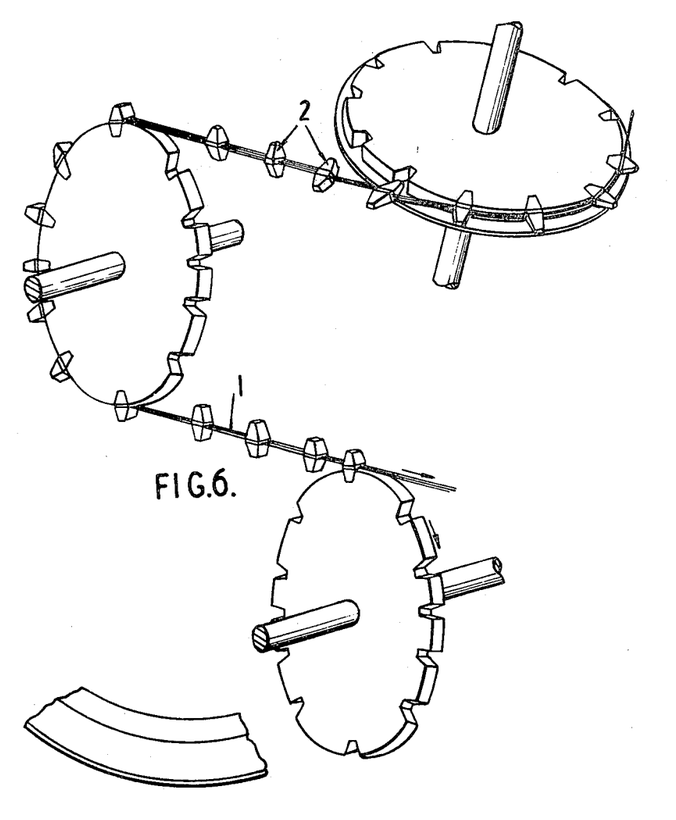
FIGURE 6 is an isometric drawing illustrating the manner in which the subject of the invention may be employed to transmit power in a diversity of directions and planes.

In FIGURE 6 is shown the manner in which the invention can be made to provide a positive transmission of power at diverse angles, and changes of direction.

Figure 6A:
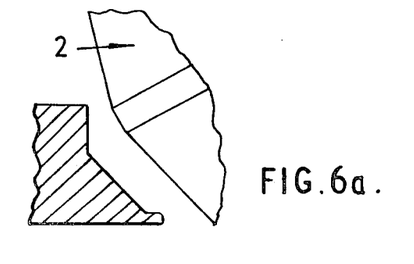
FIGURE 6a is a section on the line c–d of FIGURE 6.

Normally the "belt" will be self-aligning when a change of direction is involved but, if the distance between the wheels, pulleys or sheaves becomes too great, a deflector "skirt" may be fitted as and where appropriate (see FIGURE 6a).

Figure 7:
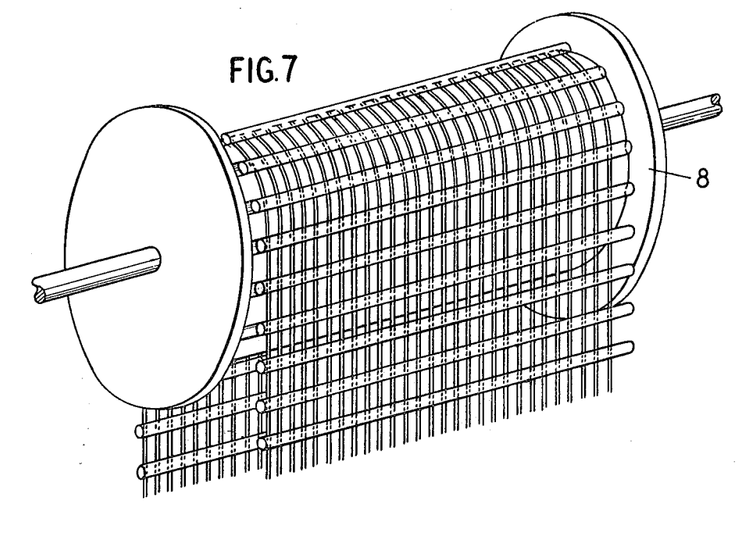
FIGURE 7 is an isometric drawing illustrating the manner in which the invention may be applied to a winding drum, e.g. a Koepe installation.
Figure 7A:
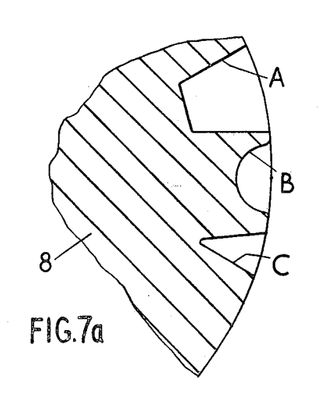
FIGURE 7a shows a detail of FIGURE 7.
Figure 8:
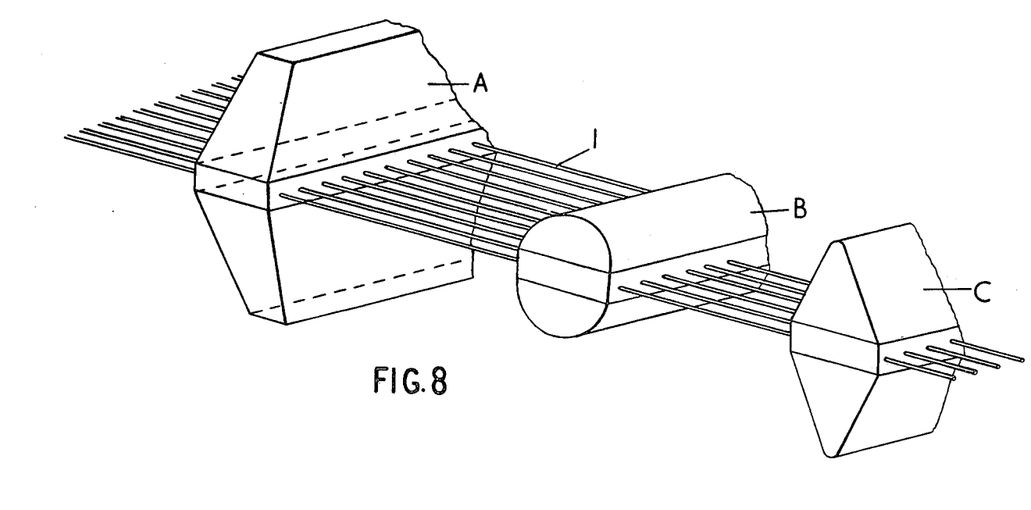
FIGURE 8 is an isometric representation of various designs of driving units which may be employed to utilise the invention.

A further manner of utilising the invention is shown by way of illustration in FIGURES 7, 7a and 7b, in which the "belt" passes over the face of a powered drum 8 possessing equi-spaced transverse grooves, the "belt" having driving modules of corresponding design to those shown at A, B or C of FIGURE 8.

The extremities of the "belt" are anchored, via suitable flat sockets or grips, to a cage, skip, or the like and may form part of a "Koepe" mine shaft hoisting system, a passenger or goods lift, a furnace skip hoist, or many other similar applications.

Figure 9:
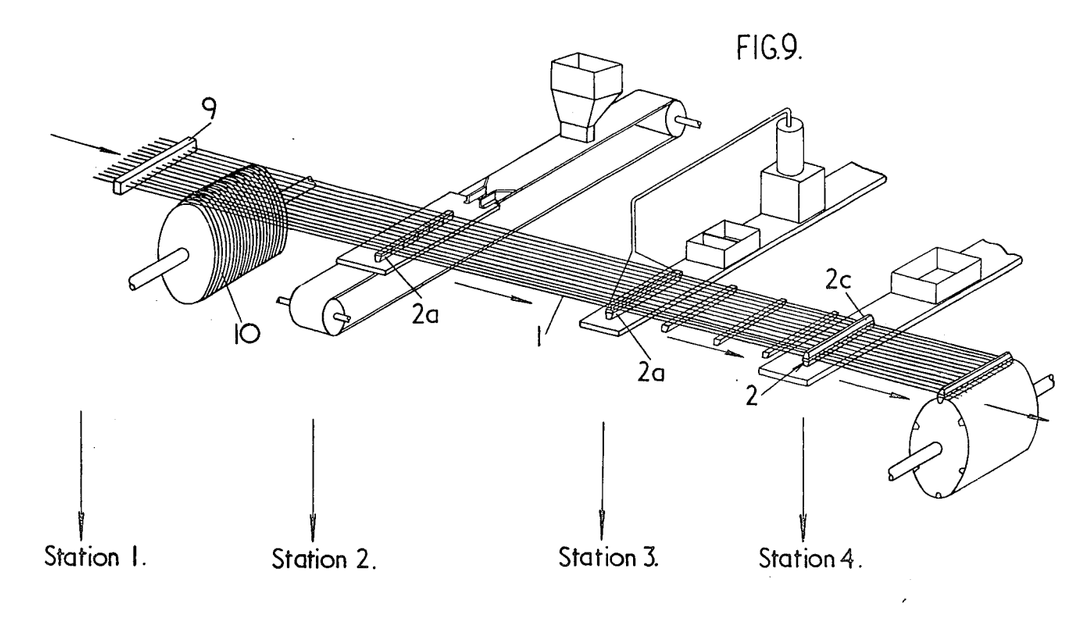
FIGURE 9 is an isometric view of an assembly layout for the manufacture of the belt.

As shown in FIGURE 9, the wires 1 are fed from a bobbin back through a fixed head 9 to a grooved roller 10 (station 1) and thence to a transverse conveyor belt (station 2) for supplying the lower halves of the modules 2.

Fixing of the wires in the modules is achieved at station 3 and of the tops of the modules at station 4.

I claim:

1. A flexible driving belt of the type having a series of spaced high tensile filamentary elements and a plurality of transmission modules interconnecting adjacent series of the filamentary elements, each of said modules comprising a body having an external geometric shape to conform to the shape of a drive member, a plurality of spaced slots in an opposed pair of side walls of said body for receiving the ends of said adjacent series of filamentary elements, and means supported by said body between said opposed pair of side walls for holding the ends of said filamentary elements in locking engagement, said holding means comprises two elongated end strips having a plurality of serrations along one of their longitudinal faces and positioned in said body such that said serrations of said end strips face each other, at least one separator strip having a plurality of serrations along opposed faces of its longitudinal dimension and disposed between said end strips, and means to selectively bring said serrations of said end strips together with said at least one separator strip in an interfitting relationship to positively hold each end of said series of said filamentary elements threaded in the space therebetween.

2. A flexible driving belt of the type having a series of spaced high tensile filamentary elements and a plurality of transmission modules interconnecting adjacent series of the filamentary elements, each of said modules comprising a body having an external geometric shape to conform to the shape of a drive member, a plurality of spaced slots in an opposed pair of side walls of said body for receiving the ends of said adjacent series of filamentary elements, and means supported by said body between said opposed pair of side walls for holding the ends of said filamentary elements in locking engagement, said holding means for at least one of said transmission modules comprises a tubular member with a plurality of holes formed through its surface crosswise to its axis at spaced intervals along its length and with block members secured to its opposite ends, and wherein said body has aligned openings formed in a second opposed pair of side walls perpendicular to said first mentioned pair of side walls, said aligned openings being shaped to receive said members and to prevent any rotational movement of said tubular member, whereby the ends of said filamentary elements are threaded into said holes in said tubular members, thereafter said tubular member is rotated until a desired tension is achieved in said filamentary elements at which time said block members are seated in said aligned openings in said second opposed pair of side walls.

3. A flexible driving belt of the type having a plurality of spaced high tensile filamentary elements and a plurality of transmission modules interconnecting the ends of the filamentary elements, each of said modules comprising a body having an upper and lower portion of identical geometric configuration and a middle portion between said upper and lower portions, said middle portion having a hollow interior, a plurality of spaced slots formed along the length of opposed pair of sides in said middle portion for receiving the ends of said filamentary elements, and means carried in said hollow interior of said middle portion for holding the ends of said filamentary elements in locking engagement, said holding means comprises two elongated end strips each having a plurality of serrations along one of its longitudinal faces and positioned in said middle portion such that said serrations of said end strips face each other, at least one separator strip having a plurality of serrations along opposed faces of its longitudinal dimension disposed between said end strips, and means to selectively bring said serrations of said end strips together with said at least one separator strip in an interfitting relationship to positively hold the ends of each of said filamentary elements threaded into the space therebetween.

References Cited

UNITED STATES PATENTS

| | | |
|---|---|---|
| 625,340 | 5/1899 | Legg. |
| 929,760 | 8/1909 | Gray. |
| 2,838,946 | 6/1958 | Kiekhaefer _________ 74—229 |
| 3,078,206 | 2/1963 | Skura _________ 74—237 XR |
| 3,103,703 | 9/1963 | Ludewig. |
| 3,313,167 | 4/1967 | Wiese _____________ 74—229 |
| 3,371,548 | 3/1968 | Marzocchi. |

FOREIGN PATENTS 635,693  3/1962  Italy.

JAMES A. WONG, Primary Examiner

U.S. Cl. X.R.

74—229